June 20, 1967        J. C. MILLER        3,326,357

THERMAL LUNCH BOX

Filed Jan. 28, 1965

INVENTOR
JOSEPH C. MILLER

BY *Anthony A. O'Brien*

ATTORNEY

United States Patent Office 3,326,357
Patented June 20, 1967

3,326,357
THERMAL LUNCH BOX
Joseph C. Miller, Rte. 1, Indiana Ave.,
Winston-Salem, N.C. 27106
Filed Jan. 28, 1965, Ser. No. 428,755
2 Claims. (Cl. 206—4)

The present invention relates to lunch boxes and in particular to a thermal type lunch box for keeping foods hot or cold as desired.

It is an object of the present invention to construct a thermal lunch box in a simple and inexpensive manner.

Another object of this invention is to provide an effective seal between the two separable parts of a lunch box.

The present invention has another object in that the interior of a lunch box is subject to the temperature of a thermally conductive vessel therein.

It is another object of the present invention to construct a thermal lunch box of insulating material in two separate sections which have sealing surfaces retained in mating relation by clamping means for the two sections.

A further object of this invention is to support a thermally conductive vessel in a lunch box of thermally insulating material in spaced relation to the walls of the box for permitting thermal equilibrium to be obtained between the vessel and the interior of the box.

In accordance with the present invention, a thermal lunch box includes separable base and cover sections made of thermal insulating material and provided with peripheral edges defining mating seal surfaces, clamping means for clamping the seal surfaces together, vessel support means integrally formed in the base section and extending toward the cover section, and a vessel of thermal conductive material seated on the support means so that it is disposed in the cover section to obtain thermal equilibrium between the vessel and the interior of the lunch box.

Other objects and advantages of the present invention will become apparent from the following description of a preferred embodiment, taken in connection with the accompanying drawing wherein.

Figure 1:
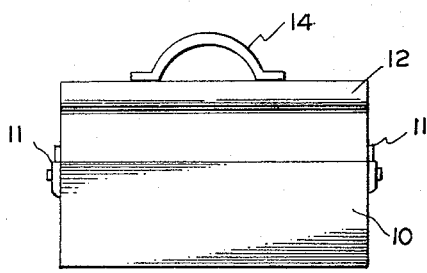
FIG. 1 is a front elevation view of a lunch box embodying the present invention.
Figure 2:
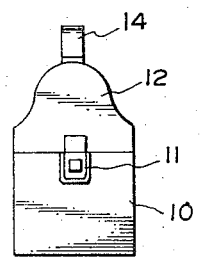
FIG. 2 is a side elevation view of FIG. 1.
Figure 3:
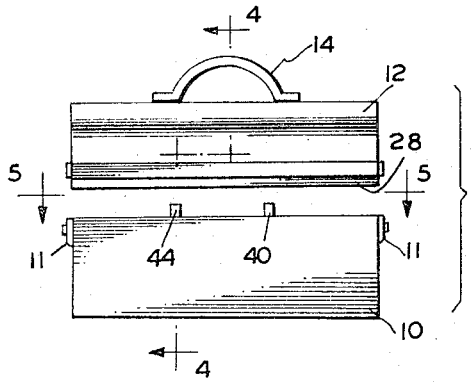
FIG. 3 is an exploded view similar to FIG. 1 with parts removed.

With reference to FIG. 1, a lunch box embodying the present invention includes a base container section 10 and a cover container section 12 with an exterior handle 14 thereon, all made from the same material having thermal insulating characteristics, such as plastic. The use of plastic has the additional advantage of facilitating inexpensive manufacture as by single molding operations for the base and cover and their parts to be described hereinafter. The base and cover sections 10 and 12 are adopted to be sealingly clamped together as by a clamp 11 on each end; the specific details of the clamps 11 have been omitted for the sake of brevity inasmuch as such clamps are well known in the art.

An elongated strip 16 has a central portion integrally formed with the top wall cover 12 and extending in spaced parallel relation to the handle 14. The opposite ends of the strip 16 incline downwardly from the central portion thereof to define flexible biasing strips 18 and 20 for a purpose to be defined hereinafter. The opposite end walls of the cover 12 are provided with centrally disposed projections 22 and 24, respectively.

Figure 4:
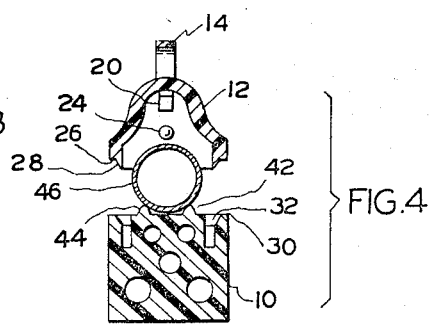
FIG. 4 is a cross-section view taken along the staggered line 4—4 of FIG. 3.

As is illustrated in FIG. 4, the peripheral edge defining the opening of cover 12 includes an outer flat portion 26 and an inner, downwardly sloping portion 28. The mating peripheral edge of base 10 is similarly formed with an outer flat portion 30 and an inner, downwardly sloping portion 32. The flat surfaces 26 and 30 and the sloping surfaces 28 and 32 are mated to form a hermetic seal whenever the cover 12 is clamped to the base 10 by the clamps 11. By locating a clamp 11 on each end of the lunch box, the clamping force will be evenly distributed around the mating peripheral edges whereby the possibility of an unsealed portion therebetween is substantially eliminated.

Figure 5:
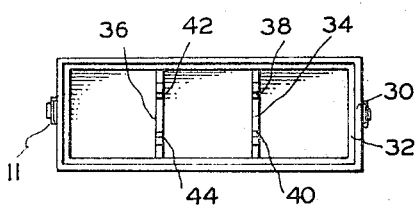
FIG. 5 is a top plan view taken along the line 5—5 of FIG. 3.
Figure 6:
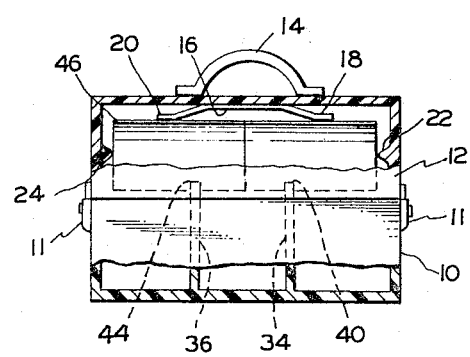
FIG. 6 is a broken away elevation view similar to FIG. 1 with parts shown in section.

A pair of spaced supports 34 and 36 are integrally formed in the base 10; although the supports 34 and 36 are shown as being integral with the bottom and side walls of base 10, it is to be understood that they may be integral only with the bottom wall or only with the side walls. Each of the supports 34 and 36 is provided with a plurality of apertures so that they do not form thermal insulating barriers but rather permit free thermal equilibrium to be established on each side thereof. As shown in FIGS. 4–6, the top surface of support 34 has a pair of spaced projections 38 and 40 which are longitudinally aligned with a similar pair of spaced projections 42 and 44, respectively, on the top surface of the other support 36. The projections 38, 40, 42 and 44 define four spaced rests upon which a container 46 is seated.

The container 46 is made of thermally conductive material, such as copper, to define a thermally conductive vessel whereby the inside of the lunch box and the vessel attain thermal equilibrium. When used as a hot lunch box, the vessel 46 is filled with a hot liquid, such as water, coffee, soup, etc. and the base 10 is filled with selected hot lunch dishes which have been heated or cooked. With this arrangement, the hot lunch dishes are maintained at a desirable temperature because the vessel 46 acts as a heating agent; since the vessel 46 may contain water heated to almost 212° F. and since the vessel 46 is made of thermally conductive material, it is apparent that the contents of the lunch box will approach thermal equilibrium whereby the temperature of the heated dishes will not drop below their initially heated temperature. It should also be noted that the apertured retainer plates 34 and 36 may provide dividers for food compartments and the apertures assure the same temperature conditions will exist in each compartment.

When utilized as a cold lunch box, the vessel 46 is filled with a cold liquid, such as water, iced tea, lemonade, etc. and cold lunch dishes are then maintained in a cooled condition.

The vessel 46 is shown in FIG. 6 as including two sections so it is possible to use a plurality of heated liquids, e.g., coffee and soup for a hot lunch box and lemonade and iced tea for a cold lunch box.

Inasmuch as the preferred embodiment of the present invention is subject to many modifications, variations and changes in details, it is intended that all matter contained in the foregoing description or shown on the accompanying drawing shall be interpreted as illustrative and not in a limiting sense.

What is claimed is:
1. A thermal lunch box comprising,
   a base section made of thermal insulating material,
   a cover section made of thermal insulating material,
   peripheral edges including an outer flat surface and an
      inner sloping surface of matching configuration on each of said base and cover sections for defining mating seal surfaces, clamping means on said base and cover sections for clamping said surfaces together so that said outer flat surfaces are in engagement with each other and the inner sloping surface of said cover section is seated within said base section, vessel supporting means integrally formed in said base section and extending toward said cover section, a vessel of thermal conductive material seated on said supporting means, said vessel being disposed in said cover section when said base and cover sections are clamped together whereby said vessel and the interior of said base and cover sections attain thermal equilibrium, and means on said cover section spacing said vessel from wall portions of said cover section, said spacing means comprising integrally formed end lugs engaging end portions of said vessel and flexible strip means biasing said vessel toward said supporting means.

2. The combination as recited in claim 1 wherein said vessel supporting means comprises a pair of spaced supports having projections thereon whereby said vessel is seated between said projections.

References Cited
UNITED STATES PATENTS

| | | | |
|---|---|---|---|
| 2,527,541 | 10/1950 | Gibbs | 206—4 |
| 2,960,216 | 11/1960 | Brady | 206—4 |
| 3,028,042 | 3/1962 | Gottsegen | 220—91 |
| 3,156,105 | 11/1964 | Bahner | 206—4 |
| 3,187,518 | 6/1965 | Bair et al. | 62—457 |

THERON E. CONDON, *Primary Examiner.*

LOUIS G. MANCENE, *Examiner.*

W. T. DIXSON, *Assistant Examiner.*